Sept. 16, 1958 P. C. PETRE 2,852,209
AIRCRAFT CONTROL SURFACE DEFLECTION APPARATUS
Filed Oct. 14, 1955 2 Sheets-Sheet 1

INVENTOR.
PHILIP C. PETRE
BY
ATTORNEY

Sept. 16, 1958    P. C. PETRE    2,852,209
AIRCRAFT CONTROL SURFACE DEFLECTION APPARATUS
Filed Oct. 14, 1955    2 Sheets-Sheet 2

INVENTOR.
PHILIP C. PETRE
BY *Ralph B. Pastoriza*
ATTORNEY

United States Patent Office 2,852,209
Patented Sept. 16, 1958

2,852,209

AIRCRAFT CONTROL SURFACE DEFLECTION APPARATUS

Philip C. Petre, Los Angeles, Calif., assignor to Aerophysics Development Corporation, a corporation of California Application October 14, 1955, Serial No. 540,507

2 Claims. (Cl. 244—42)

This invention relates generally to control surfaces, and more particularly to a drive mechanism for aerodynamically increasing the hinge moment coefficient of an aircraft control surface.

Aerodynamic booster systems to augment the mechanical or hydraulic forces applied to aircraft control surfaces are well known in the art. Generally, such systems employ a portion of the energy in the high speed air flow passing the control surface to aid the hinge moment forces intentionally applied to the surface. For example, tabs at the trailing edges of ailerons and elevators are arranged to project into the air stream to vary the hinge moment when a given maneuver is to be executed.

It is a primary object of the present invention to provide an aerodynamic control system of the above type, in which spoilers are arranged in a novel combination with a control surface such as to provide a greatly improved aerodynamic control surface deflecting scheme.

More particularly, an object is to provide a novel spoiler mechanism in combination with a hinged tab for aerodynamically increasing the hinge moment coefficient available for controlling the deflection of a control surface.

Briefly, these and other objects and advantages of the present invention are achieved by providing either by itself, or in combination with a conventional trailing edge tab, a spoiler means adapted to be projected into the air stream at a location intermediate the leading and trailing edges of a control surface and in the direction in which it is desired to move the control surface. By so disposing the spoiler means at such location, it serves to affect the air flow passing over the control surface particularly in the area between the spoiler means and the trailing edge of the control surface, so that this portion of the surface is subject to a reduced pressure. This reduced pressure aft of the spoiler means produces a hinge moment in a direction that exceeds the hinge moment established in the opposite direction by the positive pressure acting on the front of the spoiler and the drag forces acting on the spoiler. Therefore, the resultant hinge moment adds to that intentionally applied to the control surface.

In a preferred embodiment, the spoiler means acts in cooperation with a conventional trailing edge tab whereby the hinge moment coefficient may be greatly increased over values heretofore attainable by aerodynamic means.

A better understanding of the invention will be had by referring to the accompanying drawings in which.

Figure 1:
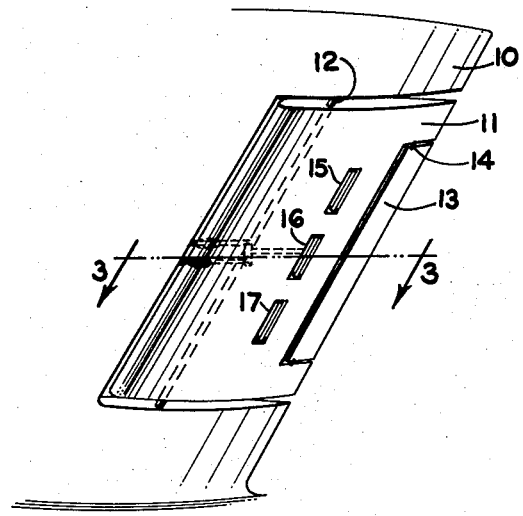
Figure 1 is an enlarged perspective view of a control surface incorporating the spoiler means of the present invention.

Referring to Figure 1 there is shown an airfoil such as an airplane tail surface 10 provided with a control surface 11 hinged to the tail as by hinge rod 12. The control surface 11 is conventionally provided with a small control tab 13 hinged adjacent its trailing edge as at 14.

In accordance with the invention, a portion of the control surface 11 is slotted at a point intermediate its leading and trailing edges as at 15, 16, and 17. Air flow spoiler means are adapted to be projected downwardly through these slots for modifying the air flow passing under the flap 11. A similar set of three slots is provided on the upper surface of the flap 11 directly opposite the slots 15, 16, and 17 and also serves as exit means for suitable spoilers.

Figure 2:
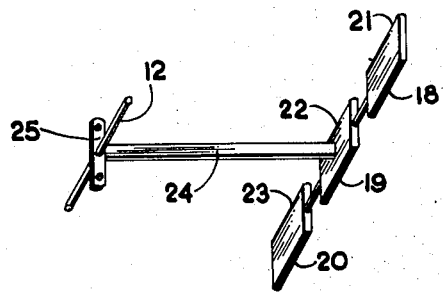
Figure 2 is a schematic perspective view of one type of spoiler arrangement that may be employed in the control surface shown in Figure 1.

Referring to Figure 2, for example, such spoilers for the lower slots 15, 16 and 17 and for the corresponding three upper slots (not shown), comprise thin plates having lower projecting edges 18, 19, and 20, and upper edges 21, 22, and 23. These plates are rigidly secured to an actuating rod 24 terminating in a T-shaped bell crank 25 adapted to rotate about the hinge rod 12.

Figure 3:
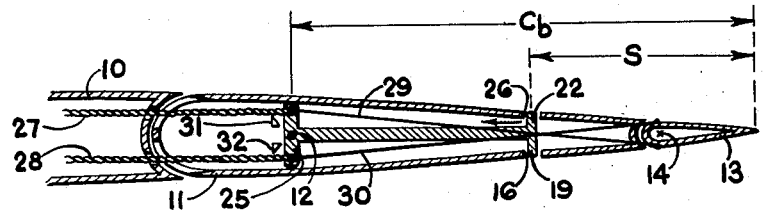
Figure 3 is a cross section of the control surface taken in the direction of the arrows 3—3 of Figure 1.

In the cross sectional view of Figure 3, the upper slot is designated 26 and serves as the exit slot for the spoiler projection 22, while the lower spoiler projection 19 is adapted to pass through the lower exit slot 16. As shown in Figure 3, there are provided a pair of control cables 27 and 28 connected to the upper and lower ends of the T-shaped bell crank portion 25. These cables pass through suitable openings into the conventional wing structure 10 and are coupled by suitable means to the manually or hydraulically operated controls within the pilot's cockpit. Also connected to the end portions of the T-shaped bell crank 25 are actuating cables 29 and 30 passing out the trailing edge of the control surface 11 to opposed upper and lower points adjacent the leading edge of the tab 13. A pair of stops 31 and 32 are positioned behind the end portions of the T-shaped bell crank to limit its rotation with respect to the hinge rod 12 in either direction.

To understand the operation of the airfoil control system of this invention, assume that control surface 11 is an elevator. To place the aircraft in a climbing attitude, the pilot manually moves the elevator controls to rotate the elevator 11 in a counterclockwise direction about the hinge rod 12. In this operation there is a tension on the control cable 27 which first serves to rotate the T-shaped bell crank 25 about the hinge rod 12 to cause the spoiler 22 to project through slot 26 and tab 13 to deflect downwardly. In most instances, the effect of the spoiler means and tab will provide sufficient hinge moment to effect the desired maneuver. In an extreme instance, further motion of the control cable 27 will then exert a force through the stop 31 to the control surface 11 to rotate it further about the hinge 12.

Figure 4:
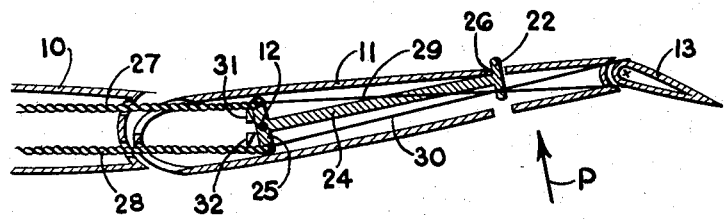
Figure 4 is a view similar to Figure 3 illustrating the control surface in a first position.

Referring to Figure 4, the elevator control 11 is shown in the position it will assume when a tension on the cable 27 is applied. It will be noted that the upper spoiler 22 will project out of the slot 26 before any movement of the flap 11 through the stop is effected. Movement of this spoiler into the air stream flowing over the upper surface of the elevator 11 at a point intermediate the leading and trailing edge of the elevator serves to modify the air flows over the remaining portion of the elevator. The modified air flows results in a net pressure acting against the opposite lower surface of the portion of the elevator to the rear of the slot 26, as indicated by the arrow P.

Experiments indicate that this net pressure P is a consequence of placing the spoiler in a position sufficiently spaced from the trailing edge to produce an increased negative pressure distribution area between the spoiler and the trailing edge, that is, aft of the spoiler. This increased negative pressure distribution provides a hinge moment which more than overcomes the hinge moment due to the positive pressure distribution in front of the spoiler and the drag acting on the spoiler.

There will also be a further force moment as a result of the position of the tab 13 shown in Figure 4, which is deflected into the air flow passing under the elevator 11. This latter air flow reacts against the lower surface of the tab 13 to create this further force moment. The pressure P will thus augment the moment about the hinge rod 12 manually established by the cable 27 and the conventional trailing tab 13. In actual wind tunnel tests, it was found that the length from the slot 26 or 16 to the trailing edge, designated S in Fig. 3, should be between .4 and .5 of the length of the elevator measured from the hinge rod 12 to the trailing edge of the tab 13 indicated as $C_b$ in Fig. 3. This length S however may vary depending, among other factors, on the Reynolds number, Mach number, and ratio of the chord of the elevator 11 to the chord of the tail surface 10, as well as the tail surface profile and thickness ratio. Further, the geometry of the tab itself may affect the optimum point of positioning for the spoiler means. The optimum positioning will thus ordinarily be determined by wind tunnel testing of the specific aerodynamic surfaces with which the spoiler means is to be used. As pointed out heretofore, however, the positioning must be such that there is left an area of said control surface aft of the spoiler means over which a negative pressure is developed establishing a hinge moment that overcomes the hinge moment established by positive pressure in front of the spoiler means and by drag forces caused by the spoiler means.

Figure 5:
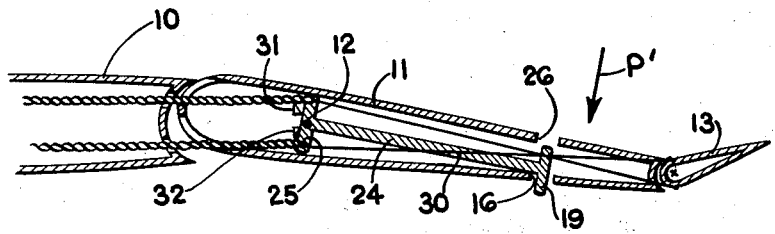
Figure 5 is a view similar to Figure 3 showing the control surface in a second position; and, Figure 6 is a qualitative graph illustrating the improvement in hinge moment coefficient attainable by means of the present invention.

In Figure 5, the elevator control 11 is shown in position for orienting the aircraft in a downward direction. To effect this maneuver, tension is applied to the lower control cable 28 to first rotate the T-shaped bell crank 25 in a clockwise direction about the hinge rod 12, until it abuts against the stop 32 at which point the tension on the lower control cable will create a given moment about the hinge rod 12. The initial movement of the rigid rod portion 24 will serve to project the lower spoiler means 19 out through the slot 16 into the air flow passing under the elevator 11. The air flow between the spoiler means 19 and the trailing edge of the elevator is thus subject to an increased negative pressure distribution area which, as in the case of Figure 4, is sufficient to overcome the positive pressure distribution normally built up in front of the spoiler. The result is a net pressure P' acting on the upper surface of the elevator to the rear of the slot 26. Simultaneously, the tab 13 will be rotated in a counterclockwise direction by means of the actuating cable 30 to provide an aerodynamic hinge moment to aid movement of the elevator 11. The pressure P', however, will augment this movement.

Figure 6:
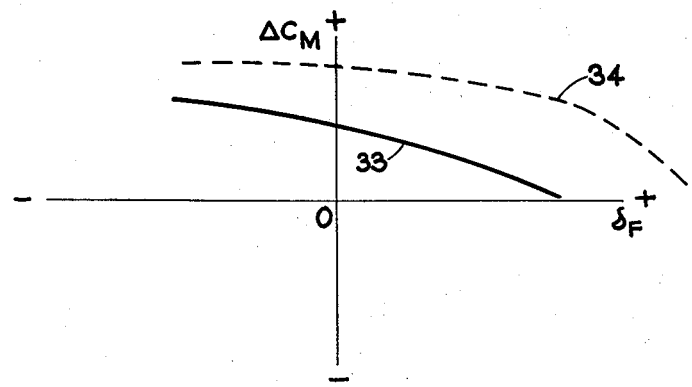

Referring to Figure 6, there is shown a plot of the change in hinge moment coefficient $\Delta C_M$ versus the angle of deflection $\delta_F$ of the control surface 11 with respect to the main airfoil surface 10. In Figure 6, the solid line curve 33 is typical of a conventional aerodynamic control system, while the dashed line curve 34 represents the improvement in increased change in hinge moment coefficient realizable by the novel spoiler means of the present invention in combination with the tab. In Figure 6, the spoiler means and tab are assumed to have been moved to a constant given position, and retained in such position for various angles of control surface deflection $\delta_F$. Thus the curve 33 represents the increments of hinge moment coefficient added to the hinge moment characteristic of the control surface without spoiler means but with conventional tabs, while the curve 34 represents the increments of hinge moment coefficient added as a result of the spoiler means and tab combination.

It will be noted from Figure 6 that at 0° control surface deflection, the combination spoiler means and tab position, as shown in Fig. 5 for example, will result in an initial increased aerodynamic hinge moment increment represented by the point where the dashed curve 34 crosses the ordinate axis, whereas the corresponding position of a conventional tab 13 without the spoiler means 19, results in a lesser initial aerodynamic hinge moment increment as indicated at the point where the solid line curve 33 crosses the ordinate axis. As the deflection angle $\delta_F$ increases, the aerodynamic hinge moment coefficient increments of a conventional control surface and tab as shown by the solid line curve 33 gradually decrease and approach 0 at some given angle of deflection $\delta_F$. In the case where the spoiler means 19 or 22 of the present invention is employed, however, the aerodynamic hinge moment increments $\Delta C_M$ approach 0 much less rapidly so that an appreciably greater control surface deflection angle is reached for the same incremental hinge moment value, as shown by the dashed curve 34. It will thus be seen that the use of the spoiler means 19 or 22 will aerodynamically increase the hinge moment coefficient increments more effectively than a conventional type tab would alone, and that accordingly, the manual or hydraulic force necessary to execute a maneuver is thereby reduced.

While the invention has been described and illustrated with respect to a conventional airfoil surface, it is to be understood that the principles thereof are applicable to any body surface passing through a fluid medium. Further, the particular actuating mechanism for projecting the spoilers into the air flow stream at points intermediate the leading and trailing edges of the control surface are merely illustrative, and may be modified considerably. In other words, any suitable mechanical, hydraulic, or electrical means may be employed for urging the spoilers into operating position. Moreover, the spoilers themselves need not necessarily take the form of flat body members passing through slots in the flap control surface, but may alternatively simply consist of any type deflectors adapted to be moved into the air stream to modify the air flow.

Further, while the invention has been described in combination with a tab control, the spoiler means may effectively be used with any type of trailing edge control mechanism such as a conventional trailing edge spoiler. Therefore, the word tab as used herein is deemed to cover broadly either a conventional tab or a conventional trailing edge spoiler.

What is claimed is:

1. In a body adapted to travel through a fluid medium, the combination comprising: a control surface; hinge means for hinging said control surface to said body for controlling the movement of said body; a tab connected to said control surface for up and down movement at the trailing edge of said control surface; spoiler means connected to said control surface for movement up and down to project respectively above and below said control surface at a given point spaced between said hinge means and said trailing edge to leave an area of said control surface aft of said spoiler means over which a negative pressure is developed establishing a hinge moment that overcomes the hinge moment established by positive pressure in front of said spoiler means and by drag forces caused by said spoiler means; and means interconnecting said tab to said spoiler means to move said tab down when said spoiler means is moved up, and to move said tab up when said spoiler means is moved down, whereby the net hinge force moment acting on said control surface as a result of fluid flow thereover is increased over a given range of control surface deflections as compared to the hinge force moment available over said same given range in the absence of said spoiler means.

2. In a body adapted to travel through a fluid medium, the combination comprising: a control surface; hinge means for hinging said control surface to said body for controlling the movement of said body; a tab connected to said control surface for up and down movement at the trailing edge of said control surface; spoiler means connected to said control surface for movement up and down to project respectively above and below said control surface at a given point spaced at a distance from said trailing edge between .4 and .5 the distance between said trailing edge and the point at which said control surface is hinged to said body; and means interconnecting said tab to said spoiler means to move said tab down when said spoiler means is moved up, and to move said tab up when said spoiler means is moved down, whereby the net hinge force moment acting on said control surface as a result of fluid flow thereover is increased over a given range of control surface deflections as compared to the hinge force moment available over said same given range in the absence of said spoiler means.

References Cited in the file of this patent

UNITED STATES PATENTS 2,570,586    Nix                    Oct. 9, 1951

FOREIGN PATENTS 1,078,576    France               May 12, 1954